(12) United States Patent
Grady et al.

(10) Patent No.: US 8,131,035 B2
(45) Date of Patent: Mar. 6, 2012

(54) CELL ANALYSIS USING ISOPERIMETRIC GRAPH PARTITIONING

(75) Inventors: Leo Grady, Yardley, PA (US); Fred S. Azar, Princeton, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 1066 days.

(21) Appl. No.: 12/025,979

(22) Filed: Feb. 5, 2008

(65) Prior Publication Data

US 2008/0187198 A1 Aug. 7, 2008

Related U.S. Application Data

(60) Provisional application No. 60/888,147, filed on Feb. 5, 2007.

(51) Int. Cl.
*G06K 9/00* (2006.01)
(52) U.S. Cl. .......................... 382/128; 382/133; 382/134
(58) Field of Classification Search .................. 382/128, 382/133–134, 173, 180; 356/39–42; 377/10–12
See application file for complete search history.

(56) References Cited

U.S. PATENT DOCUMENTS

| | | | | |
|---|---|---|---|---|
| 5,633,948 A * | 5/1997 | Kegelmeyer, Jr. | ............. | 382/132 |
| 5,764,792 A * | 6/1998 | Kennealy | ..................... | 382/133 |
| 6,351,573 B1 * | 2/2002 | Schneider | ..................... | 382/294 |
| 6,922,479 B2 * | 7/2005 | Berliner | ........................ | 382/134 |
| 7,219,016 B2 * | 5/2007 | Rimm et al. | ................... | 382/133 |
| 7,379,577 B2 * | 5/2008 | King et al. | .................... | 382/133 |
| 7,460,709 B2 * | 12/2008 | Grady | ............................ | 382/180 |
| 7,519,220 B2 * | 4/2009 | Aharon et al. | ................ | 382/173 |
| 7,555,155 B2 * | 6/2009 | Levenson et al. | ............. | 382/133 |
| 7,630,548 B2 * | 12/2009 | Grady | ............................ | 382/173 |
| 7,697,755 B2 * | 4/2010 | Lee et al. | ...................... | 382/133 |
| 8,073,220 B2 * | 12/2011 | Khamene et al. | ............. | 382/128 |
| 2002/0186875 A1 * | 12/2002 | Burmer et al. | ................ | 382/133 |
| 2004/0072143 A1 * | 4/2004 | Timmis et al. | ................ | 382/128 |
| 2005/0251347 A1 * | 11/2005 | Perona et al. | ................. | 382/128 |
| 2006/0013455 A1 * | 1/2006 | Watson et al. | ................ | 382/128 |
| 2006/0246458 A1 * | 11/2006 | Kiyuna et al. | ................ | 382/128 |
| 2007/0053560 A1 * | 3/2007 | Miller et al. | .................. | 382/128 |
| 2007/0122033 A1 * | 5/2007 | Hu et al. | ....................... | 382/128 |

OTHER PUBLICATIONS

Rabinovich, et al. Model Order Selection and Cue Combination for Image Segmentation, Published in computer Vision and Pattern Recognition, 2006 IEEE Computer Society Conference, vol. 1, Jun. 17, 2006 (pp. 1130-1137); Magazine.

(Continued)

*Primary Examiner* — Robert Kim
*Assistant Examiner* — Brooke Purinton
(74) *Attorney, Agent, or Firm* — Donald B. Paschburg; F. Chau & Associates, LLC

(57) ABSTRACT

A computer implemented method for differentiating between elements of an image and a background includes inputting an image comprising pixels forming a view of the elements and a background, providing a model for assigning a probability of belonging to a predefined class to each of the pixels, assigning a probability to each of the pixels of belonging to the predefined class, labeling each of the pixels according to a corresponding probability and a predefined threshold, determining boundaries between groups of like-labeled pixels, and outputting a visualization of the boundaries.

18 Claims, 2 Drawing Sheets

OTHER PUBLICATIONS

L. Grady, "Random walks for image segmentation," IEEE Trans. on Pattern Analysis and Machine Intelligence, vol. 28, No. 11, pp. 1768-1783, Nov. 2006.

L. Grady, "Multilabel random walker image segmentation using prior models," in Proceedings of the 2005 IEEE Computer Society Conference on Computer Vision and Pattern Recognition, ser. CVPR, vol. 1, IEEE. San Diego: IEEE, Jun. 2005, pp. 763-770.

L. Grady and E. L. Schwartz, "Isoperimetric graph partitioning for image segmentation," IEEE Trans. on Pat. Anal. and Mach. Int., vol. 28, No. 3, pp. 469-475, Mar. 2006.

Grady, et al. "Random Walks for Interactive Organ Segmentation in Two and Three Dimensions: Implementation and Validation" Published in Medical Image Computing and Computer-Assisted Intervention—MIC CAI 2005 Lecture Notes in Computer Science, vol. 3750, Jan. 1, 2005 (pp. 773-780); Magazine.

Rabinovich, et al. "Model Order Selection and Cue Combination for Image Segmentation" Published in Computer Vision and Pattern Recognition, 2006 IEEE Computer Society Conference, vol. 1, Jun. 17, 2006 (pp. 1130-1137); Magazine.

* cited by examiner

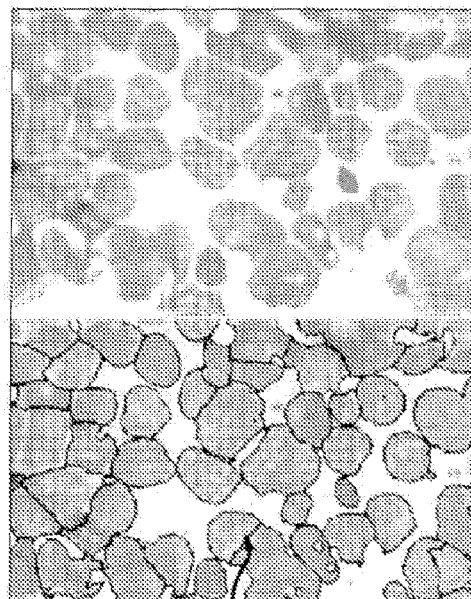
FIG. 2A
FIG. 2B
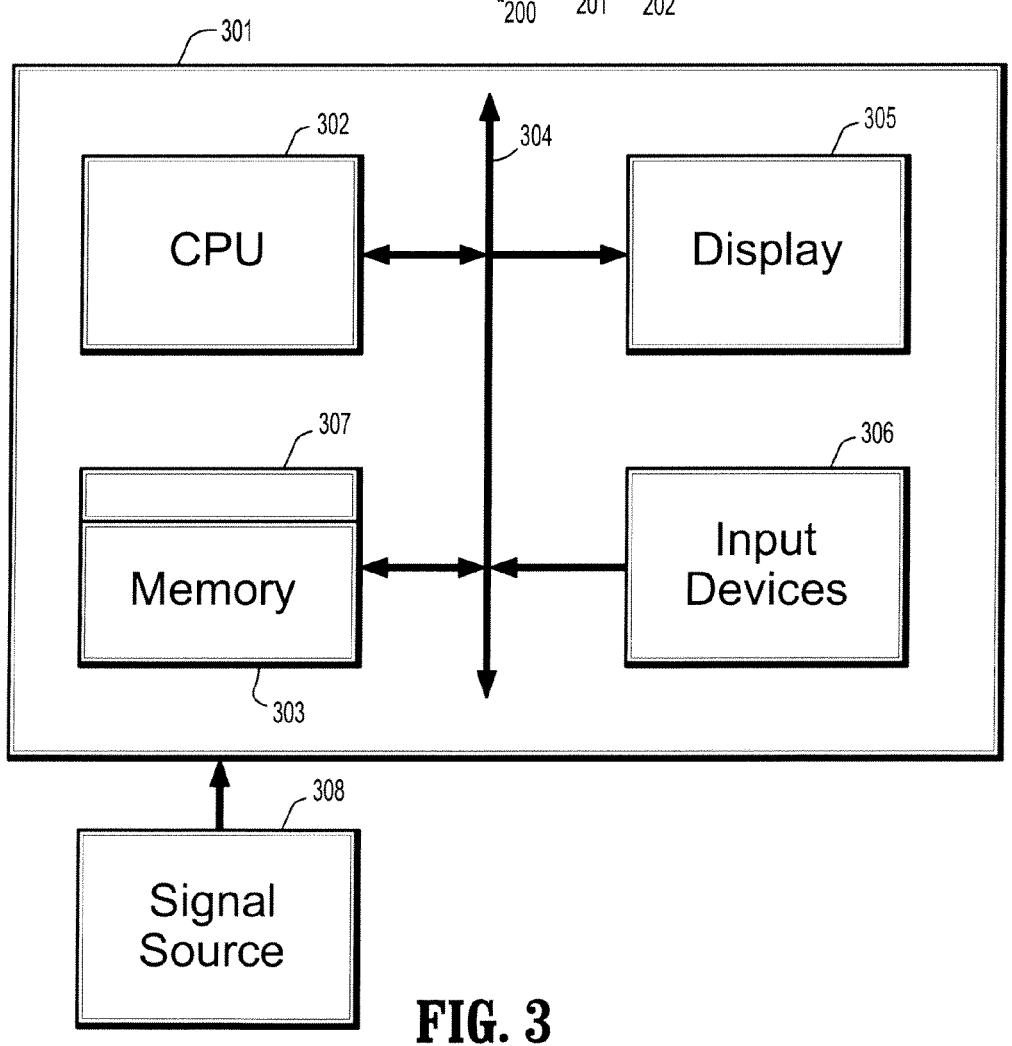
FIG. 3

CELL ANALYSIS USING ISOPERIMETRIC GRAPH PARTITIONING

CROSS-REFERENCE TO RELATED APPLICATIONS

This application claims the benefit of Provisional Application No. 60/888,147 filed on Feb. 5, 2007 in the United States Patent and Trademark Office, the contents of which are herein incorporated by reference in its entirety.

BACKGROUND OF THE INVENTION

1. Field of the Invention

The present disclosure relates to image processing, and more particularly to a system and method for segmenting and counting cells in a microscopic image.

2. Description of Related Art

Images of cells available from 2D and 3D microscopy (and other sources) are increasingly commonplace. For many different applications it is important to analyze the images by segmenting the cells in an image from the background and each other. This segmentation is often a precursor to cell counting or classification (via cell shape, color, etc.) that may be used to answer a variety of diagnostic questions. There are a number of software packages available on the market to perform automatic cell count, however these packages are highly specialized towards a specific type of microscopic images and do now allow further analyses. Furthermore, many of them require additional hardware equipment and installation, and may be quite expensive. Examples of such software include MACE (Mammalian Cell Colony Analysis—Weiss Associates), Bio-Optics Corp., Guava Technologies, Nexcelom Bioscience, New-Brunswick Scientific, Dako Corp, QM Solutions, Partec Corp, Synoptics Inc, and others.

Therefore, a need exists for generalized method for image segmentation of microscopic images.

SUMMARY OF THE INVENTION

According to an embodiment of the present disclosure, a computer implemented method for differentiating between elements of an image and a background includes inputting an image comprising pixels forming a view of the elements and a background, providing a model for assigning a probability of belonging to a predefined class to each of the pixels, assigning a probability to each of the pixels of belonging to the predefined class, labeling each of the pixels according to a corresponding probability and a predefined threshold, determining boundaries between groups of like-labeled pixels, and outputting a visualization of the boundaries.

According to an embodiment of the present disclosure, a system for differentiating between elements of an image and a background includes a memory device storing a dataset comprising image data comprising pixels forming a view of the elements of the image and a plurality of instructions embodying the system for differentiating between the elements of the image and the background and a processor for receiving the dataset and executing the plurality of instructions to perform a method comprising, providing a model for assigning a probability of belonging to a predefined class to each of the pixels, assigning a probability to each of the pixels of belonging to the predefined class, labeling each of the pixels according to a corresponding probability and a predefined threshold, determining boundaries between groups of like-labeled pixels, and outputting a visualization of the boundaries.

BRIEF DESCRIPTION OF THE DRAWINGS

Preferred embodiments of the present invention will be described below in more detail, with reference to the accompanying drawings:

FIGS. 2A-B are an input image and a segmentation results according to an embodiment of the present disclosure; and FIG. 3 is a diagram of a computer system for executing computer readable code embodying instructions for cell differentiation according to an embodiment of the present disclosure.

DETAILED DESCRIPTION OF PREFERRED EMBODIMENTS

Figure 1:
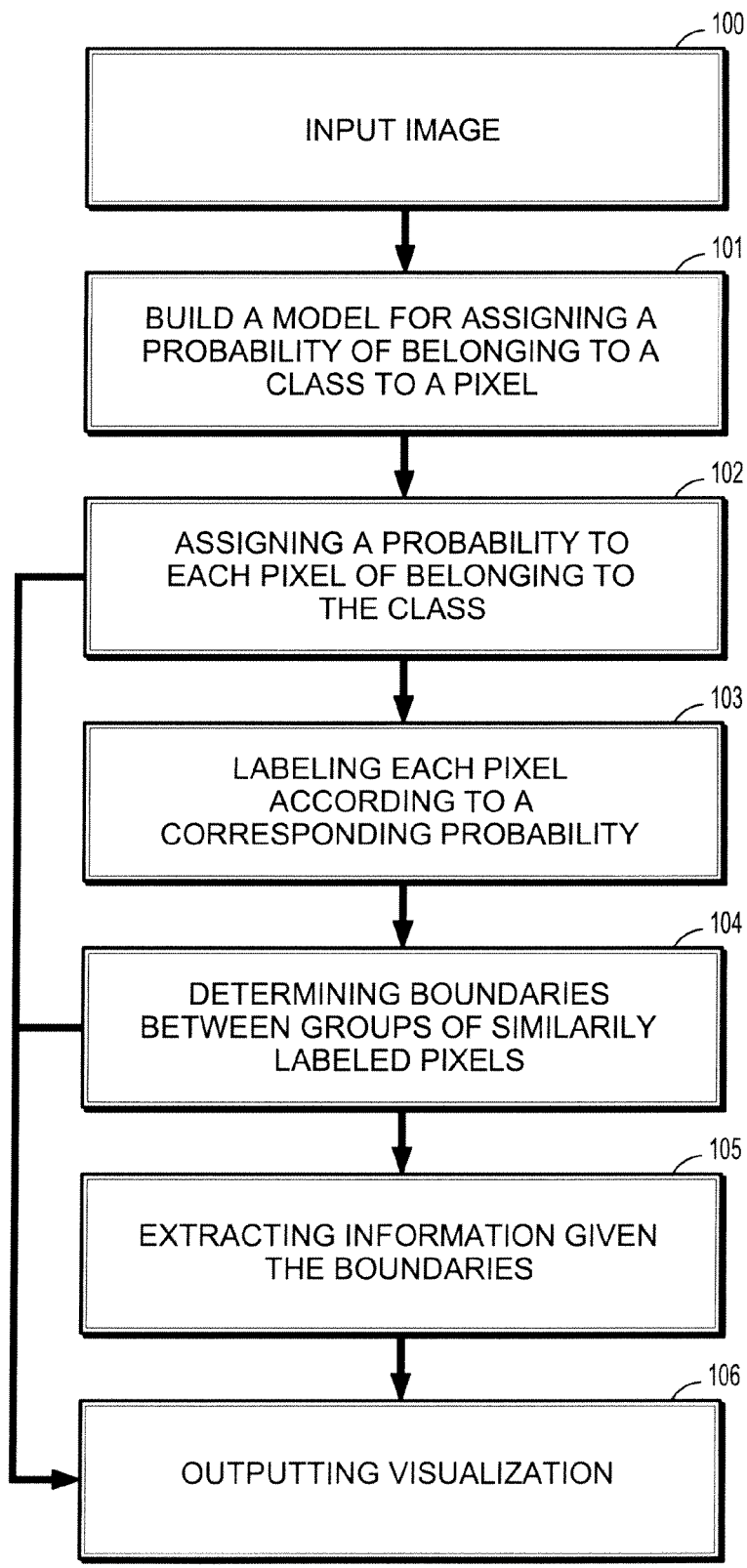
FIG. 1 is a flow chart of a method for cell differentiation according to an embodiment of the present disclosure.

According to an embodiment of the present disclosure, a system and method perform cell differentiation and segmentation includes. The method can be applied to both 2D and 3D microscopic cell images, and to a variety of cell types. The method can be extended to 4D where time is an additional parameter, such as in live microscopy or acquiring images in time to track the evolution of certain types of cells. The method enables different types of analyses including counting of cells, identifying structures inside the cells (e.g. existence and shape of nucleus), morphometric analysis of cells (e.g., for shape change assessment and shape analysis), cell surface, volume measurements, color change assessment (e.g. in fluorescence imaging), etc.

Referring to FIG. 1, a method for cell differentiation and segmentation includes obtaining a color/intensity model for the cells 101-102, using the model as a set of priors for the random walker segmentation algorithm, segment "cell" pixels from "background" pixels 103, and for each connected component of "cell" pixels, an isoperimetric segmentation algorithm to divide the component into constituent cells 104-105.

Referring to obtaining a color/intensity model for the cells 101, various methods exists to produce an appearance model for the cells. An appearance model assigns a probability $p_i$ to each pixel $v_i$ that represents the likelihood that the color/intensity associated with the pixel belongs to the cell class. One exemplary method for obtaining a mapping from color/intensity to probability is via kernel estimation (Parzen windowing), given a set of pre-labeled training samples of pixels belonging to the cell.

Given a small set of training examples for the category "cell", a model is built that assigns a probability of each pixel intensity/color to belong to class "cell" 102. Probabilities near unity are mapped to white and probabilities near zero are mapped to black (different mappings may be implemented).

Referring to the segmentation of cell clusters 103; the appearance model is sufficient to roughly classify pixels into "cell" and "background". Since the model is based purely on the intensity associated with each pixel, and not its context amongst neighbors, this model alone is susceptible to noise. To overcome this problem with noise, the learned probabilities are used as priors for a random walker to refine the label of each pixel as either "cell", or "background" 103. The solution is robust to noise and each pixel is labeled as "cell" or "background". A weighting function employed for the graph in this example may be written as $$w_{ij} = \exp-\beta(\|I_i - I_j\|)^2 \quad (1)$$

where $I_i$ represents the color at pixel $v_i$, $\beta$ is a free parameter and $\|\cdot\|$ indicates the norm of the color vector. Any measure of affinity to assign weights (e.g., color, probability difference, texture gradient, etc.) could equally be applied here.

After employing the probabilities in the building of the model 101 as the probabilities for a random walker segmentation algorithm 103, a labeling is obtained for each pixel as either "cell" or "background". Lines indicate the boundaries between regions labeled as "cell" or "background". Note that, although the labelings are correct on a pixel level, the cells are still merged and therefore need additional processing in order to differentiate individual cells.

An exemplary random walker starts on an image that contains a number of seed pixels indicating the object to segment. Given a random walker starting at every other pixel, the probability that the random walker reaches one of the seeded pixels is determined. The probability that a random walker travels into a particular direction is determined by the image structure. The change in pixel intensity is a measure for the probability by which a random walker crosses over to a neighboring pixel. Therefore, there is a high likelihood for a random walker to move inside the segmented object, but a relatively low likelihood to cross the object's boundary. By multiplying probabilities determined along the paths from pixels to seed points yields a probability distribution representing a non-binary segmentation.

Referring to the differentiation of cell clusters 104-105; although the output of the labeling step 103 gives labels for each pixel to belong to "cell" or "background", the method further differentiates each pixel labeled "cell" with a label indicating "cell 1", "cell 2", etc 104. For this purpose, a isoperimetric graph partitioning technique is sequentially applied to divide clusters until the isoperimetric ratio of the proposed division is too large to accept, represented by a threshold. In this stage the same weighting function (1) from 103 was reused.

An exemplary implementation of the isoperimetric ratio is determined as the ratio between a boundary and a volume of a given set, S, denoted by h(S). The isoperimetric sets for a graph, G (a graph is a pair G=(V,E) with vertices (nodes) $v \in V$ and edges $e \in E \in V \times V$), are any sets S and $\overline{S}$ for which $h(S)=h_G$. The specification of a set satisfying the volume constraint, $$Vol_S = \sum_i d_i \forall v_i \in S$$

together with its complement may be considered as a partition. The boundary of the set, S, is defined as $\partial S = \{e_{ij} | v_i \in S, v_j \in \overline{S}\}$, where $\overline{S}$ denotes the set complement, and $$|\partial S| = \sum_{e_{i,j} \in \partial S} w(e_{ij}).$$

An edge, e, spanning two vertices, $v_i$ and $v_j$, is denoted by $e_{ij}$. The partitioning maximizes $Vol_S$ while minimizing $|\partial S|$.

The cell segments may be further post-processed to eliminate small or otherwise undesirable (i.e., mislabeled) cells. In this example, any cells with a size below a predefined threshold were relabeled as "background". The threshold may be set according to a type of cell being imaged, for example, a certain type of cell may have a known size range, which may be used to put upper and lower limits on a differentiation of cells from background. In a similar fashion, any segmented cells for which the percentage of cells with high probability to be cell (from 101) were also reassigned to the background. For particular applications, the post-processing could also re-label some cells as background if they failed other criteria for a cell of interest, such as color, shape, presence of internal structures, etc.

FIG. 2A shows an exemplary input image while FIG. 2B shows a corresponding segmentation results. The lines 200 in FIG. 2B indicate the borders between neighboring cells, e.g., 201 or between cells and the background, e.g., 202. Given these segmentations, information about cell color, shape and number is trivial to extract.

The analysis of digital microscopy images for cell counting and many other applications includes solving the problem of segmenting the individual cells. An exemplary method employs segmentation techniques in sequential processing steps to accomplish the cell segmentation.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Referring to FIG. 3, according to an embodiment of the present invention, a computer system 301 for segmenting and counting cells in a microscopic image can comprise, inter alia, a central processing unit (CPU) 302, a memory 303 and an input/output (I/O) interface 304. The computer system 301 is generally coupled through the I/O interface 304 to a display 305 and various input devices 106 such as a mouse and keyboard. The support circuits can include circuits such as cache, power supplies, clock circuits, and a communications bus. The memory 303 can include random access memory (RAM), read only memory (ROM), disk drive, tape drive, etc., or a combination thereof. The present invention can be implemented as a routine 307 that is stored in memory 303 and executed by the CPU 302 to process the signal from the signal source 308. As such, the computer system 101 is a general purpose computer system that becomes a specific purpose computer system when executing the routine 307 of the present invention.

The computer platform 301 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for segmenting and counting cells in a microscopic image, it is noted that modifications and variations can be made by persons skilled in the art in light of the above teachings. It is therefore to be understood that changes may be made in embodiments of the present disclosure that are within the scope and spirit thereof.

What is claimed is:

1. A computer implemented method for differentiating between elements of an image and a background comprising:
   inputting an image comprising pixels forming a view of the elements and a background;
   providing a model for assigning a probability of belonging to a predefined class to each of the pixels;
   assigning a probability to each of the pixels of belonging to the predefined class;
   labeling each of the pixels according to a corresponding probability and a predefined threshold;
   determining boundaries between groups of like-labeled pixels, wherein determining boundaries between groups of like-labeled pixels comprises performing an isoperimetric graph partitioning of labeled pixels; and
   outputting a visualization of the boundaries.

2. The computer implemented method of claim 1, further comprising extracting color information of the elements, wherein the elements are defined by the boundaries.

3. The computer implemented method of claim 1, wherein the assigning of the probability to each of the pixels includes mapping probabilities near unity to a first color and mapping probabilities near zero are mapped to a second color, wherein an image of the probabilities is output.

4. The computer implemented method of claim 1, wherein the isoperimetric graph partitioning sequentially divides the groups of like-labeled pixels.

5. The computer implemented method of claim 1, further comprising extracting shape information of the elements, wherein the elements are defined by the boundaries.

6. The computer implemented method of claim 1, further comprising extracting a number of elements defined by the boundaries.

7. A system for differentiating between elements of an image and a background comprising:
   a memory device storing a dataset comprising image data comprising pixels forming a view of the elements of the image and a plurality of instructions embodying the system for differentiating between the elements of the image and the background; and
   a processor for receiving the dataset and executing the plurality of instructions to perform a method comprising,
      providing a model for assigning a probability of belonging to a predefined class to each of the pixels;
      assigning a probability to each of the pixels of belonging to the predefined class;
      labeling each of the pixels according to a corresponding probability and a predefined threshold;
      determining boundaries between groups of like-labeled pixels, wherein determining boundaries between groups of like-labeled pixels comprises performing an isoperimetric graph partitioning of labeled pixels; and
      outputting a visualization of the boundaries.

8. The system of claim 7, wherein the processor performs the method further comprising extracting color information of the elements, wherein the elements are defined by the boundaries.

9. The system of claim 7, wherein the processor performs the method comprising the assigning of the probability to each of the pixels and further mapping probabilities near unity to a first color and mapping probabilities near zero are mapped to a second color, wherein an image of the probabilities is output.

10. The system of claim 7, wherein the isoperimetric graph partitioning sequentially divides the groups of like-labeled pixels.

11. The system of claim 7, wherein the processor performs the method further comprising extracting shape information of the elements, wherein the elements are defined by the boundaries.

12. The system of claim 7, wherein the processor performs the method further comprising extracting a number of elements defined by the boundaries.

13. A method for differentiating between cell tissue and a background comprising:
   inputting an image comprising pixels forming a view of a plurality of cells and a background;
   providing a model for assigning a probability of belonging to a predefined cell class to each of the pixels;
   assigning a probability to each of the pixels of belonging to the predefined cell class;
   labeling each of the pixels according to a corresponding probability of belonging to the predefined cell class and a predefined threshold of probability;
   determining boundaries between groups of pixels labeled as belonging to the predefined cell class, wherein determining boundaries comprises performing an isoperimetric graph partitioning of the pixels labeled as belonging to the predefined cell class to differentiate between ones of the plurality of cells; and
   displaying a visualization of the boundaries.

14. The method of claim 13, further comprising extracting color information of the cells, wherein the cells are defined by the boundaries.

15. The method of claim 13, wherein the assigning of the probability to each of the pixels includes mapping probabilities near unity to a first color and mapping probabilities near zero are mapped to a second color, wherein an image of the probabilities is output.

16. The method of claim 13, wherein the isoperimetric graph partitioning sequentially divides the groups of pixels labeled as belonging to the predefined cell class.

17. The method of claim 13, further comprising extracting shape information of the cells, wherein the cells are defined by the boundaries.

18. The method of claim 1, further comprising extracting a number of the cells defined by the boundaries.

* * * * *